F. M. SHIELDS.
Cultivator.
No. 66,895.  Patented July 16, 1867.
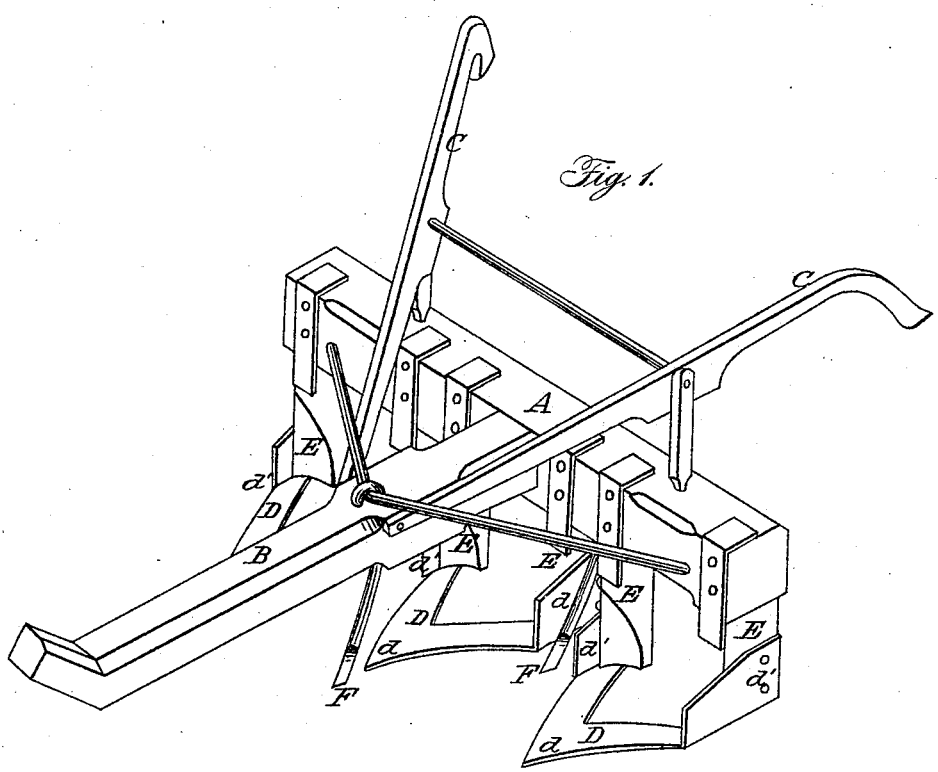
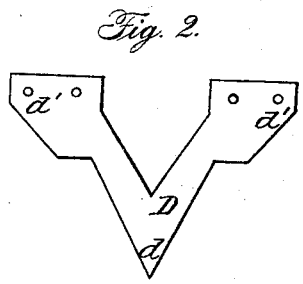
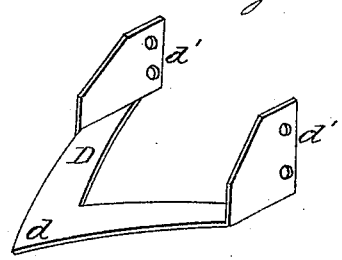
Witnesses:
Geo. A. Morrison
N. K. Ellsworth
Inventor:
F. M. Shields
per Munn & Co.
Attys

United States Patent Office.

F. MARION SHIELDS, OF MACON, MISSISSIPPI.

Letters Patent No. 66,895, dated July 16, 1867.

---

COTTON-PLOUGH OR CULTIVATOR.

---

The Schedule referred to in these Letters Patent and making part of the same.

---

TO ALL WHOM IT MAY CONCERN:

Be it known that I, F. MARION SHIELDS, of Macon, in the county of Noxubee, and State of Mississippi, have invented a new and useful Cotton-Plough or Cultivator; and I do hereby declare the following to be a full, clear, and exact description of the same, reference being had to the accompanying drawing, which is made a part of this specification, and which represents a perspective view of my improved implement.

The subject of this invention is an implement to be used for cultivating or "chopping" young cotton after the latter has been bared off in the ordinary way by the turning-plough.

A series of three or any other suitable number of peculiarly-formed hoes is attached by stocks or shanks to a horizontal beam which is provided with a tongue for the attachment of a team by which the implement is drawn back and forth over the field, the object being to adapt the work to be more rapidly and thoroughly performed, and to dispense with hand labor.

In order that others skilled in the art to which my invention appertains may be enabled to fully understand and use the same, I will proceed to describe it in detail.

In the accompanying drawing A may represent a beam, which is provided with a tongue, B, for the attachment of a team, and also with handles C C, by which latter the implement is guided by an attendant. D D D represent a series of hoes, each of which is formed of slab or sheet iron or steel, cut and bent into the form represented. Each hoe is bolted by its vertical portions $d'$ $d'$ to a pair of shanks or stocks E E, projecting downward from the beam A, to which they are rigidly secured. The pointed horizontal portions $d$ of the hoes are intended to penetrate the soil to a depth of about ten inches, and these portions are cupped or bent so as to be convex on top, the better to adapt them to turn up the soil. The penetrating portion $d$ is designed to be sharp on the edges. The vertical parts $d'$ of each hoe are also sharp on their forward edges to adapt them to cut the soil, etc., alongside of the plants. The spaces between the hoes D D D are sufficiently large to accommodate the plants, which are cultivated by the hoes on both sides of the rows as the implement is drawn forward. The stocks E E are bevelled or rounded off on the inside to enable them to turn the soil and allow it to pass freely between them. F F are fenders, one of which is attached to the tongue or draught-beam, while the others are attached to the beam A. These fenders are slightly curved at their lower ends, which move in close proximity to the surface of the ground, and they serve to knock or remove stalks and clods from the cotton. These fenders are formed of round or square iron bars.

Having thus described my invention, what I claim as new and desire to secure by Letters Patent, is—

1. The hoes D $d$ $d'$, when constructed in the manner and for the purpose herein described and represented.
2. The combination of the hoes D D D, beam A, shanks or stocks E E, draught-tongue or beam B, and handles C C, all arranged substantially in the manner and for the purpose set forth.
3. In combination with the above, the fenders F F applied in the manner and for the purpose set forth.

To the above specification of my improvement I have signed my hand this 4th day of March, 1867.

F. MARION SHIELDS.

Witnesses:
    J. F. HOLBERG,
    DANIEL DEUPUE.